United States Patent

[11] 3,610,692

| [72] | Inventor | Hendrik R. Van der Molen<br>Huize "de Kaa," Terwolde, Municipality of<br>Voorst, Netherlands |
|---|---|---|
| [21] | Appl. No. | 16,129 |
| [22] | Filed | Mar. 3, 1970 |
| [45] | Patented | Oct. 5, 1971<br>Continuation-in-part of application Ser. No. 640,692, May 23, 1967, now abandoned. |

[54] APPARATUS FOR MAKING BRUSHES
8 Claims, 10 Drawing Figs.

[52] U.S. Cl. .................................................. 300/11,
18/36, 18/DIG. 8, 249/97
[51] Int. Cl. .................................................. B25b 1/20
[50] Field of Search ...................................... 300/21, 8,
10, 11; 18/DIG. 8, 36; 249/97; 264/243

[56] References Cited
UNITED STATES PATENTS

| 2,643,158 | 6/1953 | Baldanza | 264/243 |
| 2,655,409 | 10/1953 | Baldanza | 300/21 |

*Primary Examiner*—Granville Y. Custer, Jr.
*Attorney*—Diller, Brown, Ramik & Holt ABSTRACT: Apparatus for the continuous manufacture of brushes by the injection molding technique, in which bundles of bristles are individually held in position while the leading ends of such bundles are embedded in a brush back as the latter is molded and allowed to set. The bristle bundles are passed through a grate comprised of bars and transversely disposed striplike members which define clamping means for fixing the bristle bundles during the molding operation.

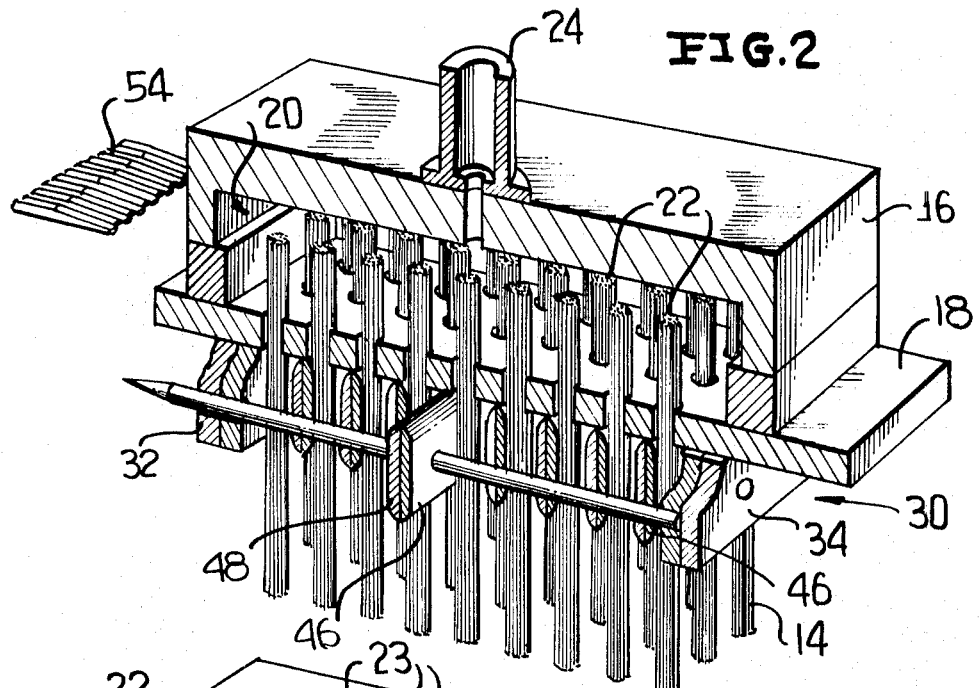
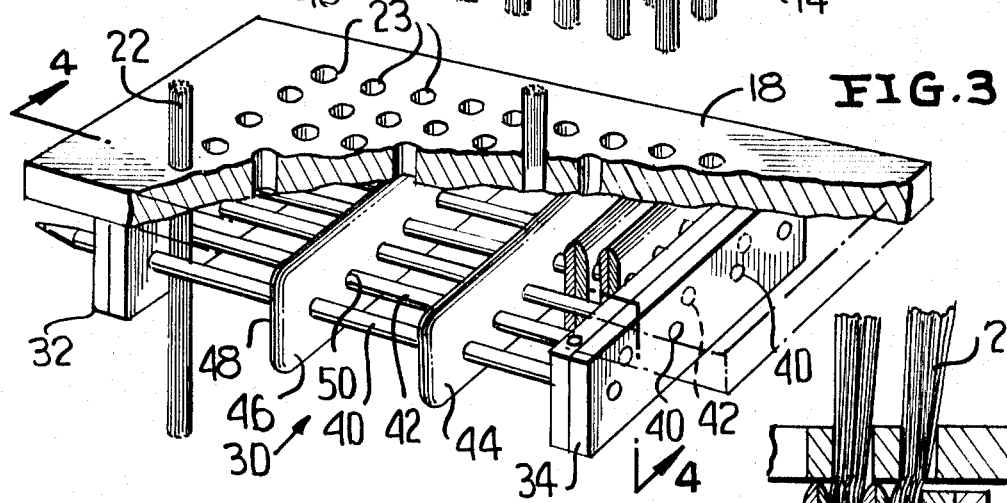
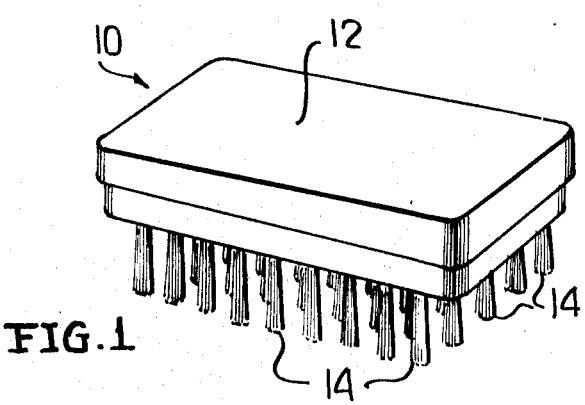
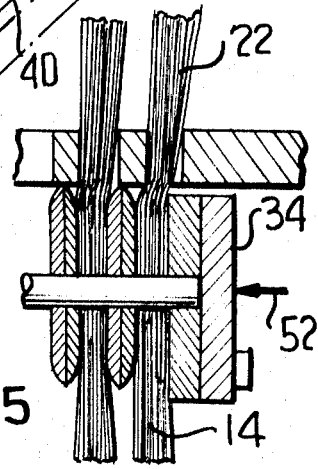
FIG.5
INVENTOR
HENDRIK R. VAN DER MOLEN

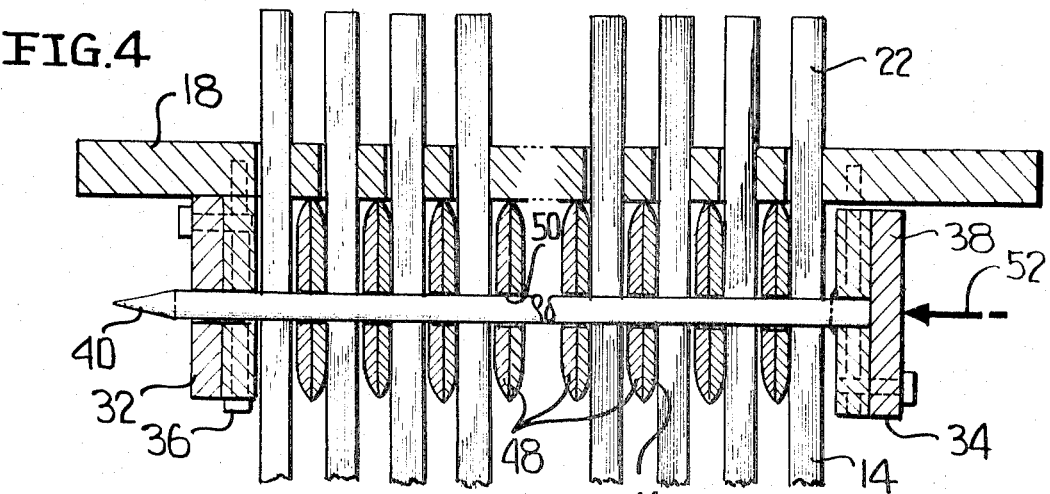
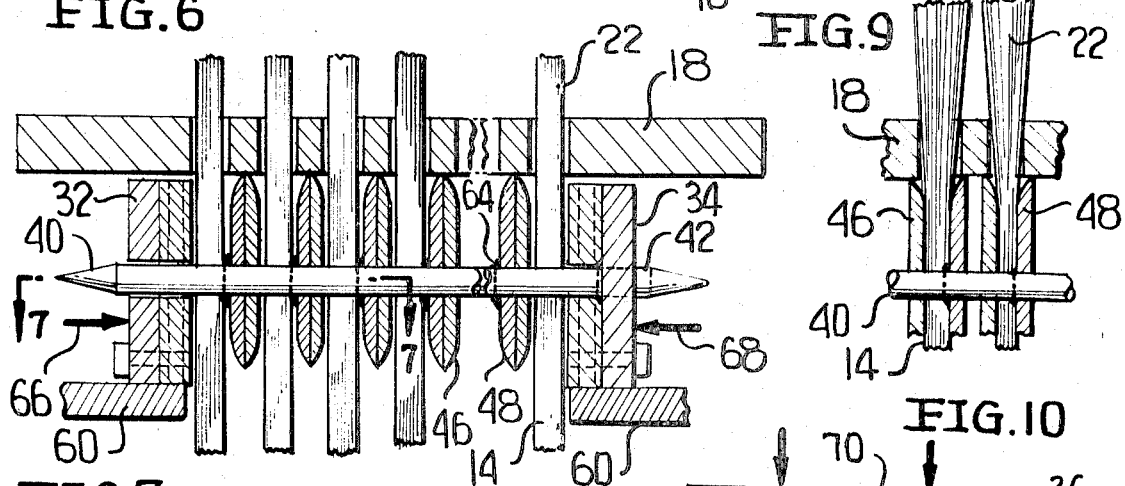
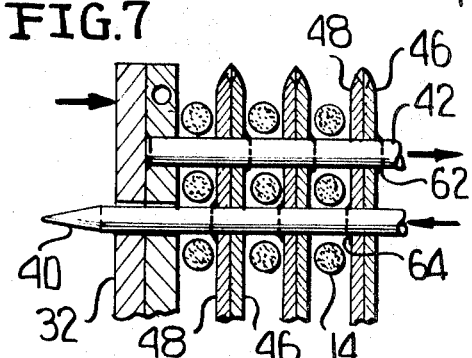
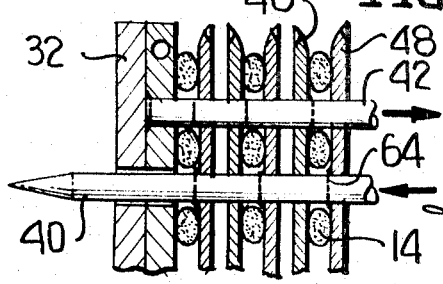

APPARATUS FOR MAKING BRUSHES

CROSS-REFERENCE TO RELATED APPLICATION

This is a continuation-in-part of application Ser. No. 640,692, filed on May 23, 1967, now abandoned.

BACKGROUND OF THE INVENTION

The invention relates to apparatus for making brushes particularly by a continuous process employing the injection molding technique.

Previously known apparatus for molding brushes have been deficient in providing clamping means for the individual bristle bundles so as to cause the bundles to be clamped without these bundles being deformed to an undue extent or partly severed.

The present invention overcomes the deficiencies of the prior art by providing a new and improved clamping means whereby the bundles of bristles are fixedly clamped during the molding operation in such a manner that the individual bristles are neither deformed nor severed.

SUMMARY OF THE INVENTION

The present invention provides apparatus wherein leading ends of distinct, endless bundles of bristles are passed through passages in a grate associated with a mold cavity. The grate has a plurality of striplike members mounted upon a plurality of parallel bars, the striplike members operating in pairs for clamping the bristle bundles therebetween.

The striplike members may be comprised of first and second half-strips, each half-strip being connected to a first set of bars while the second half-strips are connected to a second set of bars. Conventional means, such as small fluid motors, or screws, etc., may be provided for moving one set of bars for causing the first half-strips to move relative to the second half-strips for reducing the size of the passages through the grate.

Alternatively, the striplike members may be slidably mounted upon the bars such that movement of the striplike members, either toward or away from adjacent striplike members, reduces the size of the passages through the grate such that the bristle bundles are fixedly clamped relative to the mold cavity.

BRIEF DESCRIPTION OF THE DRAWINGS

FIG. 1 is a perspective view of a brush constructed in accordance with the present invention.

FIG. 2 is a fragmentary perspective view showing one form of the invention.

FIG. 3 is a fragmentary perspective view, with parts broken away for clarity for illustrating the grate structure of FIG. 2.

FIG. 4 is a vertical section taken on line 4—4 of FIG. 3.

FIG. 5 is an enlarged fragmentary view showing the manner in which bristle bundles are fixedly secured with the apparatus shown in FIGS. 2-4.

FIG. 6 is a vertical section, similar to FIG. 4, illustrating a second embodiment of the invention.

FIG. 7 is a horizontal section, taken on line 7—7 of FIG. 6, and shows alternate half-strips as being fixedly connected to alternate ones of a plurality of guide bars.

FIG. 8 is a horizontal section, similar to FIG. 7, showing the bristle bundles securely clamped between adjacent half-strip members.

FIG. 9 is an enlarged fragmentary view, showing the striplike members securely clamped against bristle bundles.

FIG. 10 illustrates another embodiment of the invention wherein the striplike members are slidably mounted upon the plurality of bars and wedge means are provided for spreading each set of striplike members for clamping bristle bundles therebetween.

DESCRIPTION OF THE PREFERRED EMBODIMENTS

FIG. 1 illustrates a brush, generally indicated by the numeral 10, constructed in accordance with the present invention. Brush 10 includes a molded back 12 having a plurality of bristle bundles 14 fixedly secured therein.

FIGS. 2-4 illustrate one form of the invention wherein a binary injection mold includes a mold half 16 which is movable up and down relative to a mold plate 18 which together form a mold cavity 20 which governs the final shape of the brush back 12. Bristle bundles 14 may be of any length and fed from a supply coil (not shown). The bristle bundles 14 having leading ends 22 which are passed through apertures 23 in plate 18 such that the leading ends 22 are encapsulated within suitable molding compositions which are introduced into mold cavity 20 through inlet port 24.

A grate, generally indicated by the numeral 30 is provided for clamping the bristle bundles 14 to ensure that the leading ends 22 are not forced outwardly from the mold cavity 20 as molding composition is fed into the mold cavity through the port 24. The grate 30 is comprised of a pair of beam members 32 and 34 disposed along marginal edges of the openings 23 in plate 18. As is best shown in FIG. 4, beam members 32 may or may not be fixedly secured to plate 18. Beam member 32 is shown as fixed to plate 18 by suitable bolts 36 while member 34 has been reversed such that a short leg 38 is slightly spaced from the plate 18.

Beam members 32 and 34 carry a plurality of horizontally disposed parallel bars 40 and 42 which carry thereon a plurality of striplike members 44 each of which may be comprised of half-strips 46 and 48. In the embodiment of FIGS. 2-4, the striplike members 44 have central openings 50 which are slightly larger than bars 40 and 42 such that the members 44 are freely slidable thereon.

Referring to FIG. 4, arrow 52 diagrammatically illustrates pressure-applying means such as a suitable fluid motor, or screw means, for applying a force against the movable beam member 34 so as to clamp bristle bundles 14 between the members 44.

FIG. 5 is an illustration of an extreme position of beam member 34 which can occur when bristle bundles 14 are comprised of small bundles. It will be seen that the bristle bundles 14 are not severed and the leading ends 22 broom out slightly so as to provide for firm anchorage with the brush back 12.

After the molding composition has solidified in mold cavity 20, the pressure on beam member 34 is released such that the bristle bundles 14 are no longer clamped, and the mold half 16 is moved upwardly an amount equal to the desired length of bristles 14 in the finished brush 10 and suitable cutters 54 are operated to sever the bristle bundles 14 so as to form the completed brush 10. During the cutting operation, the grate member 30 is closed so as to clamp the bristle bundles in position for a subsequent molding operation.

In the embodiment of FIGS. 6-9, wherein like numerals are used to indicate like parts, beam members 32 and 34 are both oriented so as to be free of plate 18 and are slidable upon support members 60. As is best shown in FIGS. 7 and 8, half-strips 46 are tack welded or otherwise fixed, at 62, to bars 42 while half-strips 48 are tack welded or otherwise secured, at 64, to bars 40. Pressure-applying means, indicated by arrows 66 and 68 in FIG. 6, act upon beam members 32 and 34 so as to clamp bristle bundles 14 between alternate half-strips 46 and 48. Half-strips 46 are moved to the right by pressure on beam member 32 while half-strips 48 are moved to the left by pressure on beam member 34. As is readily apparent from a comparison of the showings in FIGS. 7-9, there is no danger that the bristle bundles will be severed.

In the embodiment of FIG. 10 it is to be understood that the beam members 32 and 34 are both fixedly secured to the underside of plate 18 by bolts 36. Striplike members 44 are, as in the embodiment of FIGS. 2-5, provided with central openings 50 which are slightly larger than bars 40 and 42 such that the members 44 are freely slidable thereon. Thrust bars 70 include suitable wedges 72 interposed between adjacent half-strips 46 and 48 so that upon application of pressure upon thrust members 70, respective half-strips 46 and 48 are moved to the right and left, respectively so as to clamp bristle bundles 14 therebetween.

While preferred forms and arrangement of parts have been shown in illustrating the invention, it is to be clearly understood that various changes in details and arrangement of parts may be made without departing from the spirit and scope of the invention, as defined in the appended claimed subject matter.

I claim:

1. Brushmaking apparatus comprising a mold cavity, a plate having a plurality of holes formed therein for receiving therethrough distinct bundles of bristles with portions of each bundle extending from opposite sides of said plate such that part of each bundle extends into said mold cavity, and clamping means for clamping those portions of said bundles of bristles which extend from said plate on the side thereof away from said mold cavity; said clamping means comprising a plurality of bar means and a plurality of striplike members disposed adjacent to said plate for forming a grate having a plurality of passages for allowing passage of said bundles of bristles therethrough, said bar means extending along said plate and generally parallel to each other, said striplike members extending along said plate and generally parallel to each other and transversely of said bar means; and closing means for moving said striplike members relative to each other to reduce the size of said passages for gripping said bundles between adjacent ones of said striplike members.

2. Apparatus as defined in claim 1 wherein said striplike members are provided with openings therein and said bar means pass through said openings for mounting said striplike members upon said bar means.

3. Apparatus as defined in claim 2 wherein each striplike member is comprised of a first half-strip and a second half-strip, each first half-strip being connected to a first set of said bar means, each second half-strip being connected to a second set of said bar means, and means for moving one set of said bar means for causing each first half-strip to move relative to an adjacent second half-strip and grip a bundle of bristles therebetween.

4. Apparatus as defined in claim 2 wherein said openings are larger than said bar means for slidably mounting said striplike members on said bar means.

5. Apparatus as defined in claim 2 including a pair of beams disposed along opposite marginal sides of said passages, and means for moving one of said beams relative to the other for reducing the size of said passage.

6. Apparatus as defined in claim 5 wherein one of said beams is movably mounted with respect to said plate.

7. Apparatus as defined in claim 5 wherein both of said beams are movably mounted with respect to said plate.

8. Apparatus as defined in claim 5 wherein both of said beams are fixedly attached relative to said plate.